United States Patent
Iseki et al.

(10) Patent No.: US 7,335,715 B2
(45) Date of Patent: Feb. 26, 2008

(54) ETHYLENE-ALPHA-OLEFIN COPOLYMER

(75) Inventors: Yuki Iseki, Chiba (JP); Katsuhiro Yamada, Ichihara (JP); Tatsuhiro Nagamatsu, Chiba (JP)

(73) Assignee: Sumitomo Chemical Company, Ltd., Chuo-ku, Tokyo (JP)

( * ) Notice: Subject to any disclaimer, the term of this patent is extended or adjusted under 35 U.S.C. 154(b) by 0 days.

(21) Appl. No.: 11/255,867

(22) Filed: Oct. 24, 2005

(65) Prior Publication Data

US 2006/0089476 A1   Apr. 27, 2006

(30) Foreign Application Priority Data

Oct. 26, 2004 (JP) ............................. 2004-310669
Mar. 28, 2005 (JP) ............................. 2005-091265
Sep. 29, 2005 (JP) ............................. 2005-283890

(51) Int. Cl.
*C08F 210/16* (2006.01)
*C08F 210/00* (2006.01)
*C08G 61/02* (2006.01)

(52) U.S. Cl. ................ 526/348; 526/348.2; 526/348.3; 526/348.4; 526/348.5; 526/348.6; 526/352.2; 528/396

(58) Field of Classification Search ................ 526/348, 526/142, 116, 348.6, 348.2, 351, 352, 352.2; 528/396
See application file for complete search history.

(56) References Cited

U.S. PATENT DOCUMENTS

| 5,374,700 | A   | 12/1994 | Tsutsui et al. | |
|---|---|---|---|---|
| 5,840,815 | A   | 11/1998 | Tsutsui et al. | |
| 5,883,205 | A   | 3/1999  | Tsutsui et al. | |
| 6,586,356 | B2* | 7/2003  | Takaoki et al. | 502/155 |
| 6,867,277 | B2* | 3/2005  | Iseki          | 526/348.3 |
| 7,125,946 | B2* | 10/2006 | Iseki et al.   | 526/348.6 |
| 7,141,639 | B2* | 11/2006 | Iseki et al.   | 526/352 |
| 2004/0030082 | A1  | 2/2004  | Iseki      | |
| 2005/0098927 | A1* | 5/2005  | Iseki et al. | 264/464 |
| 2005/0192417 | A1  | 9/2005  | Iseki et al. | |

FOREIGN PATENT DOCUMENTS

DE            10339987 A1    3/2004

* cited by examiner

*Primary Examiner*—David W. Wu
*Assistant Examiner*—Rip A. Lee
(74) *Attorney, Agent, or Firm*—Fitch Even Tabin & Flannery

(57) ABSTRACT

An ethylene-α-olefin copolymer having monomer units derived from ethylene and monomer units derived from an α-olefin of 3 to 20 carbon atoms, a density of 906 to 970 kg/m$^3$, an activation energy of flow of 50 kJ/mol or more and a heat quantity of fusion of a cold xylene soluble part of 30 J/g or more, and satisfying specific relations among a rate of the cold xylene soluble part in the copolymer, the density, a melt flow rate and a characteristic relaxation time.

4 Claims, No Drawings

ETHYLENE-ALPHA-OLEFIN COPOLYMER

This Application is a U.S. Utility Patent Application which claims priority from Japanese Application No. JP 2004-310669, filed Oct. 26, 2004, Japanese Application No. JP 2005-09 1265, filed Mar. 28, 2005, and Japanese Application No. JP 2005-283890, filed Sep. 29, 2005, the complete disclosures of which are incorporated herein by reference.

BACKGROUND OF THE INVENTION

1. Field of the Invention

The present invention relates to an ethylene-α-olefin copolymer. More particularly, the present invention relates to an ethylene-α-olefin copolymer having a good moldability and providing extrusion-molded articles excellent in anti-blocking property and appearance.

2. Description of the Related Arts

As films and sheets used for packaging foods, pharmaceuticals, convenience goods and the like, molded articles obtained by extrusion molding of ethylene-α-olefin copolymers are much used. In these ethylene-α-olefin copolymers, excellent moldability, excellent anti-blocking property from the viewpoint of enhancement of handling ability of the molded articles, and the like are required. For example, there is disclosed an ethylene-1-butene copolymer which is obtained by copolymerizing ethylene and 1-butene with a catalyst formed from a catalyst component produced by reacting bis(indenyl)ethane, n-butyllithium and zirconium tetrachloride, silica, an organoaluminum-oxy compound and triisobutylaluminum, and which satisfies a specific relation between a melt tension and a melt flow rate of the copolymer and a specific relation between a temperature of the maximum peak in an endothermic curve of the copolymer measured by a differential scanning calorimeter and a density of the copolymer (e.g. U.S. Pat. No. 5,374,700).

In addition, there is disclosed an ethylene-α-olefin copolymer which is obtained by copolymerizing ethylene and 1-hexene with a catalyst formed from a co-catalyst carrier obtained by contacting diethyl zinc, pentafluorophenol, water and silica, racemi-ethylenebis(1-indenyl)zirconium phenoxide and triisobutylaluminum, and which has a melt flow rate within a specific range and satisfies specific relations between a melt tension and a melt flow rate and between an intrinsic viscosity and a melt flow rate (e.g. U.S. 2004/0030082 A1), and further, another ethylene-α-olefin copolymer which is obtained by copolymerizing ethylene and 1-hexene with a catalyst formed from a co-catalyst carrier obtained by contacting diethyl zinc, pentafluorophenol, water, silica and trimethyldisilazane, racemi-ethylenebis(1-indenyl)zirconium phenoxide and triisobutylaluminum, and which has a melt flow rate within a specific range and satisfies specific relations between a melt tension and a melt flow rate, between a intrinsic viscosity and melt flow rate, and additionally between a chain length of a high polymer component and a melt flow rate (e.g. DE10339987 A1).

However, molded articles obtained by extrusion-molding the above-described ethylene-α-olefin copolymers sometimes deteriorated in appearance by formation of fish eyes.

SUMMARY OF THE INVENTION

An object of the present invention is to provide an ethylene-α-olefin copolymer having a good moldability and providing molded articles excellent in anti-blocking property and appearance.

The present invention (hereinafter, sometimes referred to as "first invention") is to provide an ethylene-α-olefin copolymer having monomer units derived from ethylene and monomer units derived from an α-olefin of 3 to 20 carbon atoms, of a density (d) of 906 to 970 kg/m$^3$, wherein an activation energy (Ea) of flow is 50 kJ/mol or more, a quantity of heat of fusion of a cold xylene soluble part contained in the copolymer is 30 J/g or more, and a melt flow rate (hereinafter, sometimes referred to as "MFR", unit is g/10 minutes.), a density (d; unit is kg/m$^3$), a rate of the cold xylene soluble part (CXS; unit is % by weight), the MFR and a characteristic relaxation time (t, unit is second) satisfy relations of the following formulas (1) and (2):

$$10^{(30.3-0.0327 \times d + 0.354 \times \log MFR)} < CXS < 20 \quad (1)$$

$$2 < t \leq 5.2 \times MFR^{-0.746} \quad (2)$$

Another aspect of the present invention (hereinafter, sometimes referred to as "second invention") relates to an ethylene-α-olefin copolymer having monomer units derived from ethylene and monomer units derived from an α-olefin of from 3 to 20 carbon atoms, and having a density (d) of 906 to 970 kg/m$^3$, wherein an activation energy (Ea) of flow is 50 kJ/mol or more, a quantity of heat of fusion of a cold xylene soluble part contained in the copolymer is 30 J/g or more, and a melt flow rate (MFR, unit is g/10 minutes, a density (d; unit is kg/m$^3$) and a rate of the cold xylene soluble part (CXS; unit is % by weight) satisfy a relation of the following formula (1), and when the density is less than 915 kg/m$^3$, a chain length (A) (unit is angstrom) of the highest molecular weight component and the MFR satisfy a relation of the following formula (3) or when the density is not less than 915 kg/m$^3$, those satisfy a relation of the following formula (4):

$$10^{(30.3-0.0327 \times d + 0.354 \times \log MFR)} < CXS < 20 \quad (1)$$

$$3.3 < \log A \leq -0.0815 \times \log(MFR) + 3.96 \quad (3)$$

$$3.3 < \log A \leq -0.0815 \times \log(MFR) + 3.98 \quad (4)$$

DETAILED DESCRIPTION OF THE INVENTION

The ethylene-α-olefin copolymer of the present invention is an ethylene-α-olefin copolymer having monomer units derived from ethylene and monomer units derived from an α-olefin of 3 to 20 carbon atoms.

Examples of the α-olefin having 3 to 20 carbon atoms include propylene, 1-butene, 1-pentene, 1-hexene, 1-heptene, 1-octene, 1-nonene, 1-decene, 1-dodecene, 4-methyl-1-pentene and 4-methyl-1-hexene, and these may be used alone or in combination of 2 or more. 1-hexene and 4-methyl-1-pentene are preferred.

The content of the monomer unit derived from ethylene is from 50 to 99.5 wt % based on the total weight (100 wt %) of the ethylene-α-olefin copolymer. In addition, the content of the monomer unit derived from an α-olefin having 3 to 20 carbon atoms is from 0.5 to 50 wt % based on the total weight (100 wt %) of the ethylene-α-olefin copolymer.

The ethylene-α-olefin copolymer of the present invention may also contain monomer units derived from other monomers than ethylene and α-olefins having 3 to 20 carbon atoms within a range not damaging the effect of the present invention. Examples of other monomers include conjugated dienes (e.g. butadiene, isoprene), non-conjugated dienes (e.g. 1,4-pentadiene), acrylic acid, acrylates (e.g. methyl acrylate, ethyl acrylate), methacrylic acid, methacrylates (e.g. methyl methacrylate, ethyl methacrylate) and vinyl acetate.

The ethylene-α-olefin copolymer of the present invention is preferably a copolymer of ethylene and an α-olefin of 4 to 10 carbon atoms, more preferably a copolymer of ethylene and an α-olefin of 5 to 10 carbon atoms, most preferably a copolymer of ethylene and an α-olefin of 6 to 10 carbon atoms. Examples of the ethylene-α-olefin copolymer include an ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer and ethylene-1-butene-1-octene copolymer, preferably an ethylene-1-hexene copolymer, ethylene-1-butene-1-hexene copolymer and ethylene-1-butene-4-methyl-1-pentene copolymer, more preferably an ethylene-1-hexene copolymer and ethylene-1-butene-1-hexene copolymer.

The ethylene-α-olefin copolymer of the present invention has an MFR of usually from 0.01 to 100 g/10 minutes. The MFR is preferably 0.05 g/10 minutes or more from the viewpoint of reduction of load during extrusion molding, more preferably 0.1 g/10 minutes or more. On the other hand, the MFR is preferably 20 g/10 minutes or less from the viewpoint of improving mechanical strength of the extruded moldings, more preferably 10 g/10 minutes or less, most preferably 6 g/10 minutes or less. The MFR is a value measured under a load of 21.18 N (2.16 Kg) at 190° C. according to A-method in JIS K7210-1995. When the MFR is measured, an ethylene-α-olefin copolymer to which an antioxidant has been previously added in an amount of about 1000 wt-ppm, is used.

The ethylene-α-olefin copolymer has a density of 890 to 970 kg/m³, the density is preferably 906 kg/m³ or more from the viewpoint of improving rigidity of molded articles, more preferably 908 kg/m³ or more. On the other hand, the density is preferably 940 kg/m³ or less from the viewpoint of improving impact strength of molded articles, more preferably 930 kg/m³ or less. The density of the copolymer is measured according to A-method in JIS K7112-1980 after annealed according to JIS K6760-1995.

The ethylene-α-olefin copolymer of the present invention is a one excellent in moldability and like an ethylene-α-olefin copolymer which has a structure having a long chain branching and the activation energy of flow (Ea; unit is kJ/mol) of such the copolymer is higher than that of ordinary ethylene-α-olefin copolymers conventionally known. The Ea of the ordinary copolymer is lower than 50 kJ/mol, therefore, a sufficient satisfaction could not be sometimes obtained in the mold processability, particularly in the extrusion load.

The Ea of the ethylene-α-olefin copolymer of the present invention is, from the viewpoint of enhancing moldability, particularly from the viewpoint of reduction of extrusion load without excessive decrease of the melt tension, preferably 55 kJ/mol or more, more preferably 60 kJ/mol or more. Further, it is preferably 100 kJ/mol or less, more preferably 90 kJ/mol or less from the viewpoint of enhancement of a gloss of extrusion-molded articles.

The above-mentioned Ea is a numerical value calculated according to the Arrhenius equation from a shift factor $(a_T)$ in preparation of a master curve showing the dependency of melt complex viscosity at 190° C. (η; unit is Pa·second) on angular frequency (ω: unit is rad/second) based on the temperature-time superposition theory, and is a value which can be determined by the following method.

Namely, each of curves of the melt complex viscosity-angular frequency of the ethylene-α-olefin copolymer at temperatures (T, unit is ° C.) of 130° C., 150° C., 170° C. and 190° C., respectively, is superposed on the curve of the melt complex viscosity-angular frequency of the ethylene-α-olefin copolymer at 190° C. based on the temperature-time superposition theory, to obtain a shift factor $(a_T)$ at each of the temperatures (T), then a linear approximate equation of $[\ln(a_T)]$ and $[1/(T+273.16)]$ {the following equation (I)} is calculated by least-square method from each of the temperatures and the shift factors at each of the temperatures, respectively. Next, Ea is determined from a slope m of the linear equation and the following equation (II).

$$\ln(a_T)=m(1/(T+273.16))+n \quad (I)$$

$$Ea=|0.008314 \times m| \quad (II)$$

$a_T$: Shift factor
Ea: Activation energy of flow (unit: kJ/mol)
T: Temperature (unit: ° C.)

The above-described equation may be determined using a commercial software for a computer, and as the soft ware, for example, Rhinos V.4.4.4 (manufactured by Rheometrics Limited) can be listed.

Herein, the shift factor $(a_T)$ is a shifted amount at which double logarithmic curves of melt complex viscosity-angular frequency at each of the temperatures is shifted to the direction of $\log(Y)=-\log(X)$ axis (Y axis: melt complex viscosity, X axis: angular frequency) to superimpose on the curve of melt complex viscosity-angular frequency at 190° C., and in the superposition, each of the double logarithmic curves of melt complex viscosity-angular frequency at the respective temperature is shifted aT times in the angular frequency and 1/aT times in the melt complex viscosity. Further, the coefficient of correlation is usually 0.99 or more when the equation (I) is determined by a least-square method from values of 4 points of 130° C., 150° C., 170° C. and 190° C.

The measurement of the melt complex viscosity-angular frequency curve is usually carried out using a viscoelasticity measuring apparatus (e.g. Rheometrics Mechanical Spectrometer RMS-800 manufactured by Rheometrics, Limited) under the following conditions:

(1) Geometry; parallel plate,
(2) Diameter of plate; 25 mm,
(3) Distance between plates; 1.5 to 2 mm,
(4) Strain: 5%, and
(5) Angular frequency; 0.1 to 100 rad/second In addition, the measurement is carried out under a nitrogen atmosphere and it is preferable to add previously an antioxidant in a proper amount (e.g. 1000 wt-ppm) to the sample to be measured.

The ethylene-α-olefin copolymer of the present invention is a one containing a part which is soluble in cold xylene and is highly crystalline, in a considerable amount, and a rate of the part soluble in cold xylene satisfies the following formula (1):

$$10^{(30.3-0.0327 \times d+0.354 \times \log MFR)} < CXS < 20 \quad (1)$$

The d and MFR are as defined before.

Since the CXS of an ordinary ethylene-α-olefin copolymer which have been conventionally known, for example, that of an ethylene-α-olefin copolymer produced by using a metallocene catalyst conventionally known, is small, the copolymer does not satisfy the left side of the formula (1).

Therefore, a sufficiently satisfactory moldability, particularly a sufficiently satisfactory extrusion load could not be often obtained. Further, the CXS contained in ethylene-α-olefin copolymers obtained by using a conventionally known Zieglar-Natta catalyst, is large and the crystallinity of the cold xylene soluble part is low. Therefore, in the copolymers, a sufficiently satisfactory anti-blocking property of molded articles could not be sometimes obtained.

From the viewpoint of enhancement of the moldability, particularly reduction of the extrusion load, the CXS of the copolymer preferably satisfies the following formula (1'), more preferably the following formula (1").

$$10^{(30.4-0.0326 \times d + 0.354 \times \log MFR)} < CXS < 20 \quad (1')$$

$$10^{(30.5-0.0325 \times d + 0.354 \times \log MFR)} < CXS < 20 \quad (1'')$$

The quantity of heat of fusion of the CXS of the ethylene-α-olefin copolymer of the present invention is preferably 50 J/g or more, more preferably 70 J/g or more. On the other hand, the heat quantity of fusion is preferably 200 J/g or less from the viewpoint of enhancement of transparency of molded articles obtained.

The CXS is a value determined by the following steps (1) to (4):
 (1) About 5 g of an ethylene-α-olefin copolymer as a sample, is dissolved in 1 L of boiling xylene containing an antioxidant in a proper amount;
 (2) A boiling xylene solution prepared in (1) is cooled to room temperature over about 2 hours, and is allowed to stand still at 25° C. for 20 hours;
 (3) The xylene solution is filtered to recover a liquid part, and a xylene solvent is removed from the filtered liquid part to collect the copolymer dissolved in xylene (referred to as "cold xylene soluble part".); and
 (4) A CXS is calculated from the following equation:

$$CXS = \{[\text{weight of cold xylene soluble part}](\text{unit: g}) \times (1/\text{recovered liquid part(unit: liter)})\}/\text{weight of sample(unit: g)}\} \times 100$$

The quantity of heat of fusion of the cold xylene soluble part is a value determined by dividing the total heat quantity of fusion from 42° C. to the perfect fusion temperature (a temperature at which the fusion curve returns to the base line of high temperature side) in a fusion curve measured by a differential calorimeter (heat flux DSC; e.g. a differential scanning calorimeter DSC-7 manufactured by Perkin Elmer, Limited) by a weight of the sample used for measurement. The melting curve is a differential scanning calorie measurement curve obtained by keeping a sample at 150° C. for 2 minutes, cooling the sample from 150° C. to 40° C. at 5° C./min, keeping the sample at 40° C. for 2 minutes, and then, heating the sample from 40° C. to a temperature of higher than the perfect fusion temperature (usually about 150° C.) at 5° C./min. The weight of the sample used for measurement is usually about 10 mg.

The first ethylene-α-olefin copolymer of the present invention is a one in which the long chain length may not be too long and the characteristic relaxation time (t: unit is second) satisfies the following formula (2):

$$2 < t \leq 5.2 \times MFR^{-0.746} \quad (2)$$

wherein the MFR is as defined before.

An ethylene-α-olefin copolymer in which, for example, the length of the long chain branching may be too long, does not usually satisfy the right side of the formula (2). Therefore, the copolymer does not often provide sufficiently satisfactory molded articles in appearance. In addition, ordinary copolymers conventionally known have a characteristic relaxation time of shorter than 2 seconds because they do not have a structure such as a long chain branching.

From the viewpoint of enhancement of appearance of molded articles obtained, the characteristic relaxation time (t) of the first ethylene-α-olefin copolymer of the present invention satisfies preferably the relation of the following formula (2') and more preferably the relation of the following formula (2").

$$2 < t \leq 5.1 \times MFR^{-0.746} \quad (2')$$

$$2 < t \leq 5.0 \times MFR^{-0.746} \quad (2'')$$

The characteristic relaxation time (t) of the ethylene-α-olefin copolymer is a value determined by expressing the master curve of the melt complex viscosity-angular frequency at 190° C. prepared for calculation of the activation energy of flow (Ea) described above as the following approximate equation:

$$\eta = \eta_0/[1 + (t \times \omega)^n]$$

η; Melt complex viscosity (unit: Pa·second),
ω; Angular frequency (unit: rad/second),
$\eta_0$; Constant determined in each ethylene-α-olefin copolymer,
n; Constant determined in each ethylene-α-olefin copolymer In addition, the approximation of the above-described master curve to the above-described equation may be determined by using a commercial software for a computer, and as the soft ware, for example, Rhinos V.4.4.4 (manufactured by Rheometrics Limited) can be listed.

The second ethylene-α-olefin copolymer of the present invention is like an ethylene-α-olefin copolymer which has a structure having a long chain branching, and is an ethylene-α-olefin copolymer in which a molecular weight of the highest molecular weight component (described in detail later) is appropriately low and a chain length (A: unit is angstrom) of the highest molecular weight component satisfies the following formula (3) or (4):
 when the density is less than 915 kg/m³;

$$3.3 < \log A \leq -0.0815 \times \log(MFR) + 3.96 \quad (3), \text{ or}$$

when the density is not less than 915 kg/m³;

$$3.3 < \log A \leq -0.0815 \times \log(MFR) + 3.98 \quad (4)$$

The measurement method of the MFR is as described before.

The ethylene-α-olefin copolymer such as a one having a long chain branching, in which the molecular weight of the highest molecular weight component is too high, usually satisfies the right side of neither the formula (3) nor (4). Therefore, the copolymer can not often provide sufficiently satisfactory molded articles in appearance. In addition, from the viewpoint of improving moldability, it is preferable to satisfy the left side of the formula (3) or (4).

From the viewpoint of improving optical properties, the chain length of the highest molecular weight component of the second ethylene-α-olefin copolymer of the present invention satisfies preferably the relation of the following formula (3') or (4'):
 when the density is less than 915 kg/m3;

$$3.3 < \log A \leq -0.0815 \times \log(MFR) + 3.95 \quad (3'), \text{ or}$$

when the density is not less than 915 kg/m³;

$$3.3 < \log A \leq -0.0815 \times \log(MFR) + 3.97 \quad (4')$$

Further, it is further preferably to satisfy the relation of the following formula (3") or (4"):

when the density is less than 915 kg/m3;

$$3.3 < \log A \leq -0.0815 \times \log(MFR) + 3.94 \quad (3"), \text{ or}$$

when the density is not less than 915 kg/m³;

$$3.3 < \log A \leq -0.0815 \times \log(MFR) + 3.96 \quad (4")$$

The chain length (A) of the highest molecular weight component of the ethylene-α-olefin copolymer is a chain length at peak position of a logarithm normal distribution curve of a component having the highest molecular weight among four logarithm normal distribution curves obtained by considering a chain length distribution curve obtained by gel permeation chromatography measurement as a composite curve composed of four logarithm normal distribution curves, then by dividing the composite curve into four logarithm normal distribution curves by means of a wave analysis. The chain length of the component having the highest molecular weight can be determined by a method shown below:

(1) The chain length distribution curve, in which a weight ratio dW/d (log Aw)(y value) to log Aw (x value) as a logarithm of molecular chain length Aw is plotted by a gel permeation chromatography method, is prepared. Herein, in the gel permeation chromatography measurement, a standard polystyrene is used and the molecular weight of the standard polystyrene is converted into a molecular chain length by the following equation:

Molecular chain length (unit:angstrom)=Molecular weight of standard polystyrene/40.9

(2) A composite curve is prepared by putting together in an arbitrary ratio four logarithm normal distribution curves each having 0.30 of a standard deviation to x value and an arbitrary averaged value (usually corresponding to a chain length A at the peak position).

(3) As a degree of a shift of the measured chain length distribution curve with the composite curve, the difference (deviation) between the y value of the measured chain length distribution and the composite curve at each x value, is determined, each the deviation at each x value is respectively squared, and the total values thereof (sum of squared deviation) are determined.

(4) The average values of the logarithm normal distribution curves used in (2) and the ratios put, are changed, and the above-mentioned (2) and (3) are repeated to obtain a composite curve having the minimum sum of squared deviation.

(5) Among four logarithm normal curves constituting the composite curves obtained in (4), a molecular chain length at the peak of the logarithm normal curve having the highest molecular weight is determined. Herein, the number of plotted data on the chain length curve is at least 300 to obtain a continuous distribution curve. Further, the sum of squared deviation is usually determined based on the plotted data of at least 300.

The minimum value of the sum of squared deviation becomes usually 0.5% or less to the sum of squared deviation when ratios of the four logarithm normal curves are all zero. Further, the ratio of the peak area of the logarithm normal curve corresponding to the component of the highest molecular weight is usually 10% or more based on 100% of the total components.

The ethylene-α-olefin copolymer of the present invention has a molecular weight distribution of preferably from 5 or more, more preferably from 5.5 or more, and most preferably from 6.5 or more, from the viewpoint of improvement of moldability, particularly reduction of extrusion load. On the other hand, the molecular weight distribution is preferably 25 or less, more preferably 20 or less, most preferably 15 or less, from the viewpoint of enhancement of antiblocking property of extrusion-molded articles.

The above-mentioned molecular weight distribution is a value obtained by calculating the weight-average molecular weight (Mw) and the number-average molecular weight (Mn) each converted into polystyrene molecular weight obtained by the above-mentioned gel permeation chromatography measurement, and dividing Mw by Mn (Mw/Mn).

Generally, it is known that there is a relation to which a melt tension (MT) decreases with an increase of a melt flow rate (MFR) between the melt flow rate and the melt tension. The ethylene-α-olefin copolymer of the present invention has a high melt tension such as a one having a structure of like long chain branching, and as the copolymer, an ethylene-α-olefin copolymer which satisfies preferably the formula (5) from the viewpoints of reduction of extrusion load and of improving a haul molding processability, more preferably the formula (5'), most preferably the formula (5"). In contrast, conventional ordinary ethylene-α-olefin copolymers do not satisfy the left side of the formula (5) below.

$$2.0 \times MFR^{-0.059} < MT < 40 \times MFR^{-0.059} \quad (5)$$

$$2.2 \times MFR^{-0.059} < MT < 25 \times MFR^{-0.059} \quad (5')$$

$$2.5 \times MFR^{-0.059} < MT < 15 \times MFR^{-0.059} \quad (5")$$

The melt tension (MT; unit is cN) of the ethylene-α-olefin copolymer is measured as follows: a melted resin is extruded into air of room temperature through an orifice having a diameter of 2.09 mmφ and a length of 8 mm at a share rate of 7.4 second$^{-1}$ and 190° C. A strand extruded is taken up using a roller having a diameter of 50 mm while increasing rotation speed at a rate of 40 rpm/minute. A value of tension at which the strand shows just before breaking is regarded as the melt tension.

Generally, it is known that there is a relation to which an intrinsic viscosity ([η], unit is dL/g) decreases with an increase of an MFR between the MFR and the intrinsic viscosity. The ethylene-α-olefin copolymer of the present invention is like an ethylene-α-olefin copolymer having a long chain branching, and its intrinsic viscosity is usually lower than that of the conventional one when both copolymers have the same MFR each other. The ethylene-α-olefin copolymer of the present invention satisfies preferably the following formula (6), more preferably the following formula (6'), most preferably the following formula (6"), from the viewpoint of reduction of extrusion load and improvement of impact strength of molded articles obtained:

$$1.02 \times MFR^{-0.094} < [\eta] < 1.50 \times MFR^{-0.156} \quad (6)$$

$$1.05 \times MFR^{-0.094} < [\eta] < 1.47 \times MFR^{-0.156} \quad (6')$$

$$1.08 \times MFR^{-0.094} < [\eta] < 1.42 \times MFR^{-0.156} \quad (6")$$

The MFR is as defined before.

On the other hand, the conventional ethylene-α-olefin copolymer does not satisfy usually the right side of the following formula (6).

The intrinsic viscosity ([η]; unit is dL/g) in the above-mentioned formulas is determined by the following manners:

A tetralin solution containing 5 wt % of 2,6-di-tert-butyl-p-cresol (BHT) (hereinafter, referred to as "blank solution")

as a heat degradation preventing agent and a tetralin solution (hereinafter, referred to as "sample solution") obtained by dissolving an ethylene-α-olefin copolymer in the blank solution so that a concentration of the copolymer becomes 1 mg/ml, are prepared, and a relative viscosity (ηrel) is calculated from falling times at 135° C. of the above-mentioned sample solution and blank solution using an Ubbellohde viscometer, then, an intrinsic viscosity is determined from the following calculation.

$$[\eta]=23.3\times\log(\eta rel)$$

Generally, it is known that, between an intrinsic viscosity and swell ratio (SR) of an ethylene-α-olefin copolymer, there is a relation in which the SR increases with the decrease of the intrinsic viscosity.

It is assumed that the ethylene-α-olefin copolymer of the present invention has a structure such as a long chain branching, the present copolymer usually is higher in SR than an ordinary ethylene-α-olefin copolymer conventionally known. From the viewpoint of reduction of extrusion load and improvement of optical properties of molded articles thereof, the ethylene-α-olefin copolymer of the present invention preferably satisfies the following formula (7) or (8):

When $[\eta]<1.20$;

$$-0.91\times[\eta]+2.262<SR<2 \quad (7)$$

When $[\eta]\geq1.20$;

$$1.17<SR<2 \quad (8)$$

In contrast, the conventional ethylene-α-olefin copolymer does not usually satisfy the left side of the above-mentioned formula (7) or (8). Further, as the polymer structure like a long chain branching in the ethylene-α-olefin copolymer of the present invention, a structure in which polymer chains are closely entangled each other, is preferable, further, the copolymer preferably satisfies the following formulas (7') or (8'), more preferably the following formulas (7") or (8"):

When $[\eta]<1.23$, $$-0.91\times[\eta]+2.289<SR<1.9 \quad (7')$$

When $[\eta]\geq1.23$, $$1.17<SR<1.9 \quad (8')$$

When $[\eta]<1.30$, $$-0.91\times[\eta]+2.353<SR<1.8 \quad (7'')$$

When $[\eta]\geq1.30$, $$1.17<SR<1.8 \quad (8'')$$

The swell ratio (SR) in the above-mentioned formula (8) is a value obtained by dividing a diameter (D, unit is mm) measured at any point between 1 and 6 mm from the tip of strand by the diameter ($D_0$, unit is mm) of an orifice with 2.095 mm ($D/D_0$), wherein the strand is obtained by extruding in the shape of a strand during measuring above mentioned MFR at 1900C under a load of 21.18 N (2.16 kg) and solidified by cooling it. The diameter D is obtained as an average of three strand samples.

The melt flow rate ratio (MFRR) of the ethylene-α-olefin copolymer of the present invention is, from the viewpoint of reduction of extrusion load and improvement of moldability, preferably 60 or more, more preferably 70 or more, most preferably 80 or more. There is not particularly the upper limit, but it is preferably 300 or less. The MFRR is a value obtained by dividing a melt flow rate value measured at 190° C. under a load of 211.82 N (21.60 kg) by an MFR measured under a load of 21.18 N(2.16 kg) according to JIS K7210-1995. For the above-mentioned melt flow rate measurement, a polymer to which about 1000 wt-ppm of an antioxidant has been previously added is usually used.

When the density of the ethylene-α-olefin copolymer of the present invention is not more than 927 kg/m³, the ethylene-α-olefin copolymer preferably satisfies, from the viewpoint of improvement of heat resistance, the following (A) or (B):

(A) the ethylene-α-olefin copolymer has at least two melting points (unit is ° C.), and the maximum melting point (Tmax) is 115° C. or higher, preferably 118° C. or higher, or (B) the ethylene-α-olefin copolymer has one melting point and contains a component of a melting temperature of 118° C. or higher In addition, when the density is over 0.927 kg/m³, the copolymer is usually superior in heat resistance.

The above-mentioned melting point and presence or absence of the component fused above a specific temperature can be determined from a melting curve measured with a differential scanning calorimeter. The melting curve can be obtained by (1) keeping a sample at 150° C. for 2 minutes, (2) cooling the sample from 150° C. to 40° C. at 5° C./minute, (3) keeping the sample at 40° C. for 2 minutes, and then, (4) heating the sample 40° C. to 150° C. at 5° C./min, by using a differential scanning calorimeter. Herein, the melting curve is a differential scanning calorie measuring curve measured in (4). In addition, the melting point is a peak temperature of a fusion peak, and the weight of sample subjected to the measurement is usually about 10 mg.

A method for producing the ethylene-α-olefin copolymer of the present invention includes a method in which ethylene and an α-olefin are copolymerized in the presence of a polymerization catalyst obtained by a process comprising contacting (A) a co-catalyst carrier described below, (B) a metallocene complex having a structure in which two ligands having a cyclopentadiene skeleton are connected each other through a bridging group such as an alkylene group, silylene group or the like, and (C) an organoaluminum.

The above-described co-catalyst carrier (A) is a carrier obtained by contacting (a) diethyl zinc, (b) two kinds of fluorinated phenols, (c) water, (d) inorganic particle and (e) trimethyldisilazane [$((CH_3)_3Si)_2NH$].

Examples of the fluorinated phenol (b) include pentafluorophenol, 3,5-difluorophenol, 3,4,5-trifluorophenol and 2,4,6-trifluorophenol. Further, from the viewpoint of heightening of the activation energy of flow (Ea) of the ethylene-α-olefin copolymer obtained, it is preferable to use a combination of two kinds of phenols having the different number of fluorine, each other (e.g. pentafluorophenol/3,4,5-trifluorophenol, pentafluorophenol/2,4,6-trifluorophenol, pentafluorophenol/3,5-difluorophenol), and preferably a combination of pentafluorophenol with 3,4,5-trifluorophenol.

The molar ratio of a fluorinated phenol having a large number of fluorine to that having a small number of fluorine is 20/80 to 80/20. From the viewpoint of increase of the characteristic relaxation time t, the molar ratio is preferably smaller, and from the viewpoint of shortening of the chain length A of the highest molecular weight component, the molar ratio is preferably larger.

The inorganic particle is preferably silica gel.

The amounts of the above-mentioned components (a), (b) and (c) are not particularly restricted, and when the molar ratio (a):(b):(c) of the amounts used of the compounds is 1:x:y, it is preferable that x and y satisfy the following formula:

$$|2-X-2y| \leq 1$$

In the above-mentioned formula, x represents a number of preferably from 0.01 to 1.99, more preferably from 0.10 to 1.80, further preferably from 0.20 to 1.50, most preferably from 0.30 to 1.00.

Regarding the used amount of (d) based on (a), the amount of a zinc atom derived from (a) contained in particles obtained by contact of (a) with (d) is preferably 0.1 mmol or more, more preferably 0.5 to 20 mmol in terms of molar number of zinc atoms contained in 1 g of the resulted particles. Regarding the amount of (e) based on (d), the amount of (e) is preferably 0.1 mmol or more, more preferably 0.5 to 20 mmol per g of (d).

As a metal of (B) the metallocene complex having a structure in which two ligands having a cyclopentadiene skeleton are connected each other through a bridging group, metals of Group 4 of the Periodic Table of the Elements are preferable, and zirconium and hafnium are more preferable.

Further, examples of the ligand having a cyclopentadiene skeleton include preferably an indenyl group, methylindenyl group, methylcyclopentadienyl group and dimethylcyclopentadienyl group, and examples of the bridging group include preferably an ethylene group, dimethylethylene group and dimethylsilylene group. Furthermore, the remaining two groups bonded to the metal, include preferably, for example, a phenoxy group or alkoxy group.

As the metallocene complex (B), ethylenebis(1-indenyl)zirconium diphenoxide is preferably illustrated.

The organoaluminum compound (C) is preferably triisobutylaluminum or tri-n-octylaluminum.

The use amount of the metallocene complex (B) is preferably $5 \times 10^{-6}$ to $5 \times 10^{-4}$ mol per g of the co-catalyst carrier (A). The amount of the organoaluminum compound (C) is preferably from 1 to 2000 in terms of the ratio (Al/M) of the molar number of an aluminum atom (Al) in the organoaluminum compound (C) to the molar number of the metal atom (M) in the metallocene complex (B).

In the polymerization catalyst described above prepared by contacting the components (A), (B) and (C), if necessary, an electron donor (D) can be contacted in addition thereto.

The electron donor (D) is preferably triethylamine, tri-n-octylamine or the like.

From the viewpoint of shortening of the chain length A of the highest molecular weight component and the characteristic relaxation time t, it is preferable to use the electron donor (D), and the used amount of the (D) is preferably 0.1 mol % or more per mole of Al atom in the organoaluminum compound (C), more preferably 1 mol % or more. On the other hand, from the viewpoint of heightening the polymerization activity, the amount is preferably 10 mol % or less, more preferably 5 mol % or less.

THE polymerization method includes preferably a continuous polymerization method forming particle of an ethylene-α-olefin copolymer polymerized, for example, a continuous gas phase polymerization, continuous slurry polymerization and continuous bulk polymerization, and a continuous gas phase polymerization is more preferable.

The gas phase polymerization apparatus is usually an apparatus having a fluidized bed type reaction vessel, and preferably an apparatus having a fluidized bed type reaction vessel having an enlarge portion. A stirring blade may be installed in the reaction vessel.

As the method of feeding components for a metallocene olefin polymerization catalyst used in production of an ethylene-α-olefin copolymer of the present invention, there are usually used a method in which components are fed using an inert gas such as nitrogen or argon, hydrogen, ethylene or the like under a water-free condition, and a method in which components are dissolved or diluted in a solvent and fed in the state of solution or slurry. Components of the catalyst may be individually fed, or any components may be previously contacted in any order before feeding.

It is preferable that, before effecting real polymerization, preliminary polymerization (hereinafter, referred to as "prepolymerization") has been conducted, and the preliminary polymerized catalyst (hereinafter, referred to as "pre-polymerized catalyst") components are used as the catalyst components or catalyst for the real polymerization (hereinafter, referred to merely as "polymerization").

The polymerization temperature is usually lower than the temperature at which a copolymer to be produced is melted, and preferably from about 0° C. to about 120° C. more preferably from about 30° C. to about 100° C. The polymerization temperature is preferably high, more preferably 80° C. or higher, most preferably 85° C. or higher from the viewpoint of increase of CXS contained in the copolymer. In contrast, the polymerization temperature is preferably low, more preferably 80° C. or lower from the viewpoint of shortening of the chain length A of the highest molecular weight component or shortening of the characteristic relaxation time t.

During polymerization, an inert gas may be coexisted in the polymerization gas, and hydrogen may be added.

The concentration of hydrogen to ethylene in the polymerization gas is preferably high from the viewpoint of shortening the chain length A of the highest molecular weight component and characteristic relaxation time t of the ethylene-α-olefin copolymer, on the other hand, the hydrogen concentration is preferably low from the viewpoint of reducing a CXS. Further, the concentration of the α-olefin to ethylene in the polymerization gas is preferably low from the viewpoint of heightening the fusion calorie of CXS.

In the production of the ethylene-α-olefin copolymer of the present invention, it is preferable that the process contains a step of kneading an ethylene-α-olefin copolymer obtained by polymerization with (1) an extended flow kneading die, for example, a die developed by Utracki et al and disclosed in U.S. Pat. No. 5,451,106, (2) an extruder equipped with counter-rotating twin screws having a gear pump, or the like.

The ethylene-α-olefin copolymer of the present invention may contain known additives, if necessary. Examples of the additives include antioxidants, weather resistant agents, lubricants, anti-blocking agents, antistatic agents, defogging agents, non-dripping agents, pigments, fillers and the like.

The ethylene-α-olefin copolymer of the present invention is molded to various shaped articles (e.g. films, sheets, bottles, trays) by an extrusion molding (e.g. inflation film molding, T-die film forming), injection molding, compression molding, or the like. As the molding method, an extrusion molding is preferably applied, and extrusion molded articles are applied to a wide variety of uses such as food packaging and surface protection.

EXAMPLE

The present invention will be illustrated based on examples and comparative examples below.

Physical properties and structures in Examples and Comparative Examples were measured according to the following methods:

[Physical Properties and Structures of Polymer]

(1) Melt Flow Rate (MFR)

It was measured by A-method under conditions of 190° C. and a load of 21.18N according to JIS K7210-1995. For the measurement, the polymer to which 1000 ppm of an antioxidant (Irganox® 1076 manufactured by Ciba Specialty Chemicals, Ltd.) had been previously added, was used.

(2) Melt Flow Rate Ratio (MFRR)

The melt flow rate ratio (MFRR) is a value obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, the polymer to which 1000 ppm of an antioxidant (Irganox® 1076 manufactured by Ciba Specialty Chemicals, Ltd.) had been previously added, was used.

(3) Swell Ratio (SR)

It is a value obtained by dividing a diameter D measured at any point between 1 and 6 mm from the tip of strand by the diameter ($D_0$) of an orifice with 2.095 mm ($D/D_0$), wherein the strand was obtained by extruding in the shape of a strand during measuring the above-mentioned MFR at 190° C. under 21.18 N (2.16 kg) of loads and solidified by cooling it. The diameter D was obtained as an average of three strand samples.

(4) Density (Unit: $kg/m^3$)

The density of a polymer was measured according to A method in JIS K7112-1980 after annealed according to JIS K6760-1995.

(5) Activation Energy of Flow (Ea, Unit: kJ/mol)

Melt complex viscosities and angular frequencies at 130° C., 150° C., 170° C. and 190° C. were measured under the following conditions using a viscoelasticity measuring apparatus (Rheometrics Mechanical Spectrometer RMS-800 manufactured by Rheometrics, Limited) to prepare a melt complex viscosities-angle frequency curve. From the curve obtained, a master curve of melt complex viscosities-angular frequency at 190° C. was prepared using a computer software Rhios V.4.4.4 (manufactured by Rheometrics, Limited) and the activation energy (Ea) was determined.

<Measurement Condition>
Geometry: parallel plate
Plate diameter: 25 mm
Plate distance: 1.5 to 2 mm
Strain: 5%
Angle frequency: 0.1 to 100 rad/minute
Measurement atmosphere: nitrogen (6) Characteristic Relaxation Time (t, Unit: Second)

It was determined from the master curve of melt complex viscosities-angular frequency at 190° C. prepared in (5) described above using the computer software Rhios V.4.4.4 (manufactured by Rheometrics, Limited).

(7) Molecular Weight Distribution (Mw/Mn)

A weight-average molecular weight (Mw) and number-average molecular weight (Mn) were measured using a gel permeation chromatography (GPC) under conditions (i) to (viii) below, and Mw/Mn was determined.

(i) Apparatus: Waters 150C (manufactured by Water limited)
(ii) Separation column: TOSOH TSKgelGMH-HT
(iii) Measurement temperature: 140%
(iv) Carrier: o-dichlorobenzene
(v) Flow amount: 1.0 mL/minute
(vi) Injection amount: 500 μL
(vii) Detector: differential refraction
(viii) Standard substance of molecular weight: standard polystyrene (8) Chain Length of the Highest Molecular Weight Component It was calculated using the molecular weight distribution curve obtained in (7) by the following procedures (i) to (v):

(i) A chain length distribution curve, in which a weight ratio dW/d (log Aw)(y value) to log Aw (x value) as a logarithm of molecular chain length Aw is plotted, is determined from the molecular weight distribution curve. Herein, in the gel permeation chromatography measurement, a molecular weight of a standard polystyrene was converted into a molecular chain length by the following equation:

Molecular chain length (angstrom)=Molecular weight of standard polystyrene/40.9

(ii) A composite curve was prepared by putting together four logarithm normal distribution curves each having 0.30 of a standard deviation to x value and an arbitrary average value (usually corresponding to a chain length A at the peak position) in arbitrary ratios.

(iii) The sum of squared deviation between y values of the chain length distribution curve obtained in (i) and the composite curve obtained in (ii) at the same x value, was determined.

(iV) The average values of the logarithm normal distribution curves and ratios of the logarithm normal distribution curves to be put used in (ii) were changed and the above-mentioned steps (ii) and (iii) were repeated to obtain a composite curve in which, defining the sum squared of deviation as T when the ratios of four logarithm normal curves were all zero, the sum of squared deviation became 0.005×T or less.

(v) Among four logarithm normal curves constituting the composite curve obtained in (iv), a peak molecular chain length of the logarithm normal distribution curve having the highest molecular weight was determined.

(9) Rate of Cold Xylene Soluble Part (CXS)

The CXS can be determined by the following steps (i) to (iv):

(i) About 5 g of an ethylene-α-olefin copolymer as a sample, is dissolved in 1 L of boiling xylene containing an antioxidant in a proper amount;
(ii) A boiling xylene solution prepared in (1) is cooled to room temperature over about 2 hours, and is allowed to stand still at 25° C. for 20 hours;
(iii) The xylene solution is filtered to recover a liquid part, and a xylene solvent is removed from the filtered liquid part to collect the copolymer dissolved in xylene (referred to as "cold xylene soluble part".); and
(iv) A CXS is calculated from the following equation, CXS={[weight of cold xylene soluble part](unit: g)× (1/recovered liquid part (unit: liter))}/weight of sample (unit: g)}×100

(10) Differential Scanning Calorie Measurement

It was measured using a sample of about 10 mg with a differential calorie meter (DSC-7 type manufactured by Perkin-Elmer, Limited) of a sample under the following conditions to prepare a melting curve.

<Measurement Condition>

A sample was kept at 150° C. for 2 minutes, cooled from 150° C. to 40° C. at 5° C./min, kept at 40° C. for 2 minutes, then heated from 40° C. to 150° C. at 5° C./min.

(11) Intrinsic Viscosity ([η], Unit: dL/g)

A tetralin solution in which 2,6-di-tert-butyl-p-cresol (BHT)(blank solution) was dissolved at a concentration of 0.5 g/L (hereinafter, referred to as "blank solution") and a sample solution in which an ethylene-α-olefin copolymer was dissolved in the blank solution so that the concentration of the copolymer became 1 mg/1 mL, were prepared, falling times of the sample solution and blank solution were measured using an Ubbellohde viscometer, a relative viscosity ($\eta_{rel}$) at 135° C. was calculated from the falling times, then an intrinsic viscosity ([η]) was calculated by the following formula:

$$[\eta] = 23.3 \times \log(\eta_{rel})$$

[Properties of Film]

(12) Fish Eye (Unit: Number/m$^2$)

An ethylene-α-olefin copolymer was used and processed using an inflation film molding machine (manufactured by Sumitomo Heavy Industries Modern Ltd., a full flight type single screw extruder (40 mmϕ, L/D=26), a dice (75 mmϕ, a lip gap of 1 mm) under conditions of a processing temperature of 170° C., an extrusion rate of 12.5 kg/hr and a blow ratio of 1.8, to obtain a film having a thickness of 30μ. The number of detects (fish eyes) of 0.2 mm or larger per 1 m$^2$ of thus obtained film was counted using LAZER EYE-1000 (manufactured by Yasukawa Denki Seisakusho, K.K.) under conditions of a flying spot transmitted light receiving mode and a test width of 300 mm.

(13) Anti-Blocking Property

A degree of tackiness of a film prepared in (12) was evaluated with the following classification depending on a tactile impression:

○: no tackiness

Δ: Somewhat tacky

X: Considerably tacky

[Moldability]

(14) Resin Pressure (Unit: MPa)

An inflation film of 80 μm in thickness was formed using a full flight type single screw extruder (30 mmϕ, L/D=28) manufactured by Placo K.K., a dice (die diameter of 50 mmϕ, a lip gap of 0.8 mm), and a double slit air ring under conditions of a processing temperature of 170° C., an extrusion rate of 5.5 kg/hr, a frost line distance (FLD) of 200 mm and a blow ratio of 1.8. When the film of 80μ in thickness was formed, the resin pressure of the extruder was measured. When the resin pressure is lower, the moldability is more excellent.

(15) Melt Tension (MT, Unit: CN)

A melted resin filled in a barrel of 9.5 mmϕ was extruded through an orifice having a diameter of 2.09 mmϕ and a length of 8 mm with a piston at an extrusion speed of 5.5 mm/min (share rate of 7.4 second$^{-1}$) at 190° C. using a melt tension tester manufactured by Toyo Seiki Seisakusho, and the extruded resin was taken up using a roller having a diameter of 50 mmϕ with at a upward rotation speed of 40 rpm/minute. A value of tension which the strand shows just before breaking was regarded as the melt tension. When this value is larger, the moldability is more excellent.

Example 1

(1) Preparation of Co-catalyst Carrier

Into a reactor equipped with a stirrer, purged with nitrogen were charged 2.8 kg of silica (Sylopol 948 manufactured by Devison, Ltd; average particle size=55 μm; pore volume=1.67 ml/g; specific surface area=325 m$^2$/g) heat-treated at 300° C. under a nitrogen flow and 24 kg of toluene, then the resulting mixture was stirred. The mixture was cooled to 5° C., then, a mixed solution of 0.91 kg of 1,1,1,3,3,3-hexamethyldisilazane and 1.43 kg of toluene was added thereto dropwise over 33 minutes while keeping 5° C. After completion of the dropping, the mixture was stirred at 5° C. for 1 hour and at 95° C. for 3 hours and filtrated. Thus obtained solid was washed six times with each toluene of 21 kg. Thereafter, 6.9 kg of toluene was added to obtain a slurry, then, the mixture was allowed to stand still overnight.

Into the slurry obtained above were charged 2.05 kg of a hexane solution of diethylzinc (diethylzinc concentration: 50 wt %) and 1.3 kg of hexane, then stirred. Thereafter, the mixture was cooled to 5° C., then a mixed solution of 0.77 kg of pentafluorophenol and 1.17 kg of toluene was added thereto dropwise over 61 minutes while keeping 5° C. After completion of the dropping, the mixture was stirred at 5° C. for 1 hour, then at 40 for 1 hour. Then, 0.11 kg of H$_2$O was dropped over 1.5 hours while keeping 5° C. After completion of the dropping, the mixture was stirred at 5° C. for 1.5 hours, additionally at 55° C. for 2 hours. Then, 1.4 kg of a hexane solution of diethylzinc (diethylzinc concentration: 50 wt %) and 0.8 kg of hexane were charged to the resultant. After cooled to 5° C., a mixed solution of 0.42 kg of 3,4,5-trifluorophenol and 0.77 kg of toluene was added dropwise over 60 minutes while maintaining 5° C. of a temperature inside the reactor. After completion of the dropping, the resulting mixture was stirred at 5° C. for 1 hour, additionally at 40 for 1 hour. Thereafter, 0.077 kg of H$_2$O was added dropwise over 1.5 hours while maintaining 5° C. of a temperature inside the reactor. After completion of the dropping, the resulted mixture was stirred at 5° C. for 1.5 hours, at 40° C. for 2 hours, additionally at 80° C. for 2 hours. After stirring, the supernatant liquid was removed so that the remainder became 16 L, 11.6 kg of toluene was added, then the resulting mixture was stirred. The mixture was heated to 95° C., then stirred for 4 hours. The mixture was allowed to stand still to cause precipitation of solid components, and when the interface of a layer of the precipitated solid components and an upper layer of slurry part was observed, the slurry part of the upper layer was removed, then, the remaining liquid component was filtrated through a filter. The solid product obtained was washed 4 times with each toluene of 20.8 kg, then three times with each hexane of 24 L. Then, the solid was dried to obtain a solid component (hereinafter, referred to as "co-catalyst carrier (A1)").

(2) Preparation of Pre-polymerization Catalyst Component

Into a previously nitrogen-purged autoclave having a content volume of 210 L equipped with a stirrer were charged 0.70 kg of the co-catalyst carrier (A1), 3 L of hydrogen converted under normal temperature and normal pressure, 20 g of 1-butene and 80 L of butane, then the autoclave was heated to 40° C. Further, ethylene was charged in an amount corresponding to 0.03 MPa of gas phase pressure in the autoclave, and, after the system was stabilized, 210 mmol of triisobutylaluminum, 70 mmol of racemi-ethylenebis(1-indenyl)zirconium diphenoxide were added to initiate polymerization. The mixture was heated to 42° C. and further to 50° C. while continuously feeding ethylene and hydrogen, polymerization for 4 hours in total was carried out. After completion of the pre-polymerization, ethylene, butane, hydrogen gas and the like were purged and the remaining solid was dried under vacuum at room temperature, to obtain a co-catalyst component in which 13 g of ethylene had been pre-polymerized per g of the above-mentioned co-catalyst carrier (A1).

(3) Production of ethylene-α-olefin Copolymer

Using the pre-polymerization catalyst component obtained above, copolymerization of ethylene and 1-hexene was carried out in a continuous type fluidized bed gas phase polymerization apparatus to obtain ethylene-1-hexene copolymer powder.

The polymerization conditions included a temperature of 82° C., a total pressure of 2 MPa, a hydrogen molar ratio to ethylene of 0.7% and a 1-hexene molar ratio to ethylene of 1.4%, and during the polymerization, ethylene, 1-hexene and hydrogen were continuously fed for maintaining the gas composition constant. Further, the above-mentioned pre-polymerization catalyst component, tri-isobutyl aluminum and triethylamine of 3% in terms of a molar ratio to tri-isobutyl aluminum were fed continuously so as to maintain a total powder weight in the fluidized bed of 80 kg constant. The average polymerization time was 4 hr.

The powder of ethylene-1-hexene copolymer thus obtained was blended with an antioxidant (Sumilizer GP manufactured by Sumitomo Chemical Company, Ltd.) (concentration 750 wt-ppm), and granulated under conditions of a feed rate of 50 kg/hr, a screw rotation of 450 rpm, gate opening of 50%, suction pressure of 0.1 MPa, and resin temperature of 200 to 230° C. to obtain an ethylene-1-hexene copolymer. Properties of the obtained ethylene-1-hexene copolymer were evaluated and the results were shown in Table 1.

Example 2

(1) Preparation of Pre-Polymerization Catalyst Component

A pre-polymerization catalyst component was prepared in the same manner as in (1) and (2) of Example 1.

(2) Production of ethylene-α-olefin Copolymer

Copolymerization of ethylene and 1-hexene was carried out in the same manner as in Example 1 (3) using the pre-polymerization catalyst component obtained as above with a continuous fluidized bed gas phase polymerization apparatus.

Thus obtained powder of an ethylene-1-hexene copolymer was granulated in the same manner as in Example 1 (3) except that the antioxidant was not added, to obtain an ethylene-1-hexene copolymer. Properties of the obtained ethylene-1-hexene copolymer were evaluated and the results were shown in Table 1.

Comparative Example 1

(1) Preparation of Co-catalyst Carrier

Into a four-necked 5 L-flask purged with nitrogen were charged 1.5 L of tetrahydrofuran and 1.35 L of a hexane solution of diethylzinc (diethylzinc concentration: 2 mol/L), and cooled to 5° C. Then, a solution in which 0.2 kg (2 mol) of pentafluorophenol has been dissolved in 500 mL of tetrahydrofuran, was added thereto dropwise over 60 minutes. After completion of the dropping, the mixture was stirred at 5° C. for 1 hour, warmed to 45° C. over 28 minutes, and then, stirred for 60 minutes. Thereafter, the resultant was cooled to 5° C. with an ice bath, 45 g (2.5 mol) of $H_2O$ was dropped over 90 minutes. After completion of the dropping, the resulting mixture was stirred at 20° C. for 60 minutes, warmed to 45° C. over 24 minutes, and then, stirred for 60 minutes. Thereafter, while heating from 20° C. to 50° C. for 2 hours, removal of the solvent was carried out under a reduced pressure for 120 minutes, then drying was carried out under a reduced pressure for 8 hours to obtain 0.43 kg of a solid component.

Into a four-necked 5 L-flask purged with nitrogen were charged 0.43 kg of the above-described solid component and 3 L of tetrahydrofuran, then stirred.

Silica (0.33 kg)(Sylopol 948 manufactured by Devison; average particle size=61 μm; pore volume=1.61 ml/g; specific surface area=296 $m^2$/g) heat-treated at 300° C. under nitrogen flow was added thereto. After the resulting mixture was heated to 40° C. and stirred for 2 hours, the mixture was allowed to stand still to cause precipitation of a solid component, and when an interface of a layer of the precipitated solid component and an upper layer of slurry part was observed, the slurry part of the upper layer was removed. Further, as a washing operation, there was carried out a operation composed of adding 3 L of tetrahydrofuran to the layer of the solid component, then allowing the resulting mixture to stand still after stirring to cause precipitation of a solid component, and, when an interface of a layer of the precipitated solid component and an upper layer of a slurry part was observed, removing the slurry part of the upper layer. Furthermore, the above-described washing operation was carried out five times. Thereafter, the solid was dried at 120° C. for 8 hours under a reduced pressure to obtain 0.52 kg of a solid component (hereinafter, referred to as "co-catalyst carrier (A2)").

(2) Preparation of Pre-polymerization Catalyst Component

Into a previously nitrogen-purged autoclave having a content volume of 210 L equipped with a stirrer were charged 80 L of butane containing 2.5 mmol/L of triisobutylaluminum in concentration and 28 L of hydrogen converted under normal temperature and normal pressure, and heated to 40° C. Further, ethylene was charged in an amount corresponding to 0.3 MPa of gas phase pressure in the autoclave, and, after the system was stabilized, 200 mmol of triisobutylaluminum, 28 mmol of racemi-ethylenebis(1-indenyl)zirconium diphenoxide, and subsequently 0.2 kg of the co-catalyst carrier (A2) were charged to initiate polymerization. The mixture was heated from 40° C. to 50° C. while continuously feeding ethylene and hydrogen, polymerization for 4 hours in total was carried out. After completion of the pre-polymerization, ethylene, butane and hydrogen gas were purged and the remaining solid was dried under vacuum at room temperature, to obtain a pre-polymerization catalyst component in which 60 g of ethylene had been pre-polymerized per g of the above-mentioned co-catalyst carrier (A2).

(3) Production of ethylene-α-olefin Copolymer

Copolymerization of ethylene and 1-hexene was carried out in the same manner as in Example 1 (3) using the pre-polymerization catalyst component obtained as above with a continuous fluidized bed gas phase polymerization apparatus except that the hydrogen molar ratio to ethylene in polymerization was adjusted to about 0.3% and the 1-hexene molar ratio to ethylene in polymerization was adjusted to about 1.8% to obtain a powder of an ethylene-1-hexene copolymer.

The powder was blended with calcium stearate of 1000 wt-ppm and an antioxidant (Sumilizer GP manufactured by Sumitomo Chemical Company, Ltd.) of 1800 wt-ppm, and granulated with a single screw extruder (40 mmφ, L/D=28, fullflight type screw) (manufactured by Tanabe Plastics K.K.) under conditions of 150° C. and a screw rotation number of 80 rpm to obtain an ethylene-1-hexene copolymer. The ethylene-1-hexene copolymer was evaluated. Results are shown in Table 1.

Comparative Example 2

(1) Preparation of Co-catalyst Carrier

Into a stainless steel reactor of a content volume of 180 L equipped with a stirrer and a jacket, purged with nitrogen were charged 9.7 kg of silica (Sylopol 948 manufactured by Devison; average particle size=58 μm; pore volume=1.65 ml/g; specific surface area=298 m$^2$/g) heat-treated at 300° C. under nitrogen flow and 100 L of toluene. After the mixture was cooled to 2° C., a toluene solution (23.3 kg) of PMAO (PMAO-s, manufactured by Tosoh-Finechem Ltd.)(75.9 mol in terms of Al atom) was added thereto dropwise over 62 minutes. After completion of the dropping, the mixture was stirred at 5° C. for 30 minutes, heated to 95° C. over 2 hours, then stirred at 95° C. for 4 hours. Thereafter, the mixture was cooled to 40° C., then transferred to another stainless steel reactor of a content volume of 180 L equipped with a stirrer and a jacket, purged with nitrogen. A component derived from silica in the mixture was precipitated over 50 minutes, then a slurry component of an upper layer was removed. Thereafter, as a washing operation, sedimentation was carried out over about 45 minutes after adding 100 L of toluene and stirring for 10 minutes, then a slurry of the upper layer was removed. Then, the above-described washing operation was repeated three times. Then, the precipitated slurry was transferred to a filtering machine made of stainless steel having a content volume of 430 L (filtering machine having a filter, a stirrer and a jacket) purged with nitrogen with 120 L of toluene. After stirring for 10 minutes, filtration was carried out, then filtration was carried out again after adding 100 L of toluene and stirring for 10 minutes. Further, as a washing operation, a filtration was carried out after an addition of 100 L of hexane and stirring of 10 minutes. This washing operation was repeated twice in total. Thus obtained slurry was transferred with 70 L of hexane to a dryer having a content volume of 210 L (dryer having a stirrer and a jacket), made of SUS and purged with nitrogen. Then, drying was carried out by flowing nitrogen at a jacket temperature of 80° C. for 7.5 hours to obtain a solid component of 12.6 kg (hereinafter, referred to as "co-catalyst carrier (S)").

(2) Preparation of Pre-polymerization Catalyst Component

Into a previously nitrogen-purged autoclave having a content volume of 210 L equipped with a stirrer were charged 120 L of butane containing triisobutylaluminum of a concentration of 2.5 mmol/L and 40 L of hydrogen converted under normal temperature and normal pressure, then the autoclave was heated to 47° C. Further, ethylene was charged in an amount corresponding to 0.3 MPa of gas phase pressure in the autoclave, and after the system was stabilized, 300 mmol of triisobutylaluminum, 15 mmol of racemi-ethylenebis(1-indenyl)zirconium dichloride were charged, subsequently 0.25 kg of the co-catalyst carrier (S) was added to initiate polymerization, the pre-polymerization was carried out for a total time of 4 hours while continuously feeding ethylene and hydrogen. After completion of polymerization, ethylene, butane and hydrogen gas were purged and the produced solid was dried under vacuum at room temperature, to obtain a pre-polymerized catalyst component in which 33 g of ethylene had been polymerized per g of the above-mentioned co-catalyst carrier (S).

(3) Production of ethylene-α-olefin Copolymer

Copolymerization of ethylene and 1-hexene was carried out in the same manner as in (3) of Example 1 except that the molar ratio of hydrogen to ethylene was changed to 0.15%, and the molar ratio of 1-hexene to ethylene was changed to 1.8% to obtain an ethylene-1-hexene copolymer powder. Thus obtain powder was granulated in the same manner as in Comparative Example 1(3) to obtain an ethylene-1-hexene copolymer. The copolymer was evaluated in physical properties. The result of the evaluation is shown in Table 1.

Comparative Example 3

(1) Preparation of Co-catalyst Carrier

Into a four-necked flask of 3 L purged with nitrogen were charged 0.2 kg of silica (Sylopol 948 manufactured by Devison; average particle size=61 μm; pore volume=1.70 ml/g; specific surface area=291 m$^2$/g) heat-treated at 300° C. under nitrogen flow and 1.2 L of toluene, then the resulting mixture was stirred. The mixture was cooled to 5° C., then, a mixed solution of 84.4 ml (0.4 mmol) of 1,1,1,3,3,3-hexamethyldisilazane and 115 ml of toluene was added thereto dropwise over 25 minutes. After completion of dropping, the mixture was stirred at 5° C. for 1 hour and at 95° C. for 3 hours and filtrated. Thus obtained solid was washed four times with each toluene of 1.2 L and 95° C. using a filter. Thereafter, 1.2 L of toluene was added to obtain a slurry, then, the mixture was allowed to stand still overnight.

Into the slurry obtained above were charged 0.550 L of a hexane solution of diethylzinc (diethylzinc concentration: 2 mol/L), then the mixture was cooled to 5° C. A mixed solution of 105 g (0.570 mol) of pentafluorophenol and 173 ml of toluene was added thereto dropwise over 65 minutes. After completion of dropping, the mixture was stirred at 5° C. for 1 hour, then at 40° C. for 1 hour. After cooled to 5° C. with an ice bath, 14.9 g (0.828 mol) of H$_2$O was dropped over 90 minutes. After completion of dropping, the mixture was stirred at 5° C. for 1.5 hours, additionally at 40° C. for 2 hours, then was allowed to stand still at room temperature overnight. Thereafter, the mixture was stirred at 80° C. for 2 hours, then was allowed to stand still to cause precipitation of a solid component, and when the interface of a layer of the precipitated solid component and an upper layer of slurry part (suspension) was observed, the slurry part of the upper layer was removed, then, after the remaining liquid component was filtrated off through a filter, 1.7 L of toluene was added and the resulting mixture was stirred at 95° C. for 2 hours (first separation operation). The mixture was allowed to stand still to cause precipitation of a solid component, and when the interface of a layer of the precipitated solid component and an upper layer of slurry part was observed, the slurry part of the upper layer was removed, then, the remaining liquid component was filtrated off through a filter (second separation operation).

Thereafter, the similar separation operations as above using toluene of 1.7 L and 95° C. and then using hexane of 1.7 liters and room temperature were carried out 4 times and twice, respectively. Thereafter, the solid was dried to obtain 3.9 kg of a solid component (hereinafter, referred to as "co-catalyst carrier (A3)").

(2) Preparation of Pre-polymerization Catalyst Component

Into a previously nitrogen-purged autoclave having a content volume of 210 L equipped with a stirrer were charged 100 L of butane containing triisobutylaluminum at a concentration of 2.5 mmol/L, 0.5 L of 1-butene and 100 L of hydrogen under normal temperature and normal pressure. Then, the autoclave was heated to 23° C. Further, ethylene was charged in an amount corresponding to 0.2 MPa of gas phase pressure in the autoclave, and after stabilization in the system, 250 mmol of triisobutylaluminum, 30 mmol of racemi-ethylenebis (1-indenyl)zirconium diphenoxide, subsequently 0.20 kg of the above-mentioned co-catalyst carrier (A3) were added to initiate polymerization. The mixture was heated to 30° C. and further, while continuously feeding ethylene and hydrogen, pre-polymerization for a total time of 4 hours was carried out at 30° C. After completion of pre-polymerization, ethylene, butane, hydrogen gas and the like were purged and the remaining solid was dried under vacuum at room temperature, to obtain a catalyst component in which 58 g of ethylene and 1-butene had been pre-polymerized per g of the above-mentioned co-catalyst carrier (A3).

(3) Production of ethylene-α-olefin Copolymer

Using the pre-polymerization catalyst component obtained above, copolymerization of ethylene and 1-hexene was carried out in a continuous type fluidized bed gas phase polymerization apparatus to obtain ethylene-1-hexene copolymer powder.

The polymerization conditions included a temperature of 85° C., a total pressure of 2 MPa, a gas linear velocity of 0.24 m/sec, a hydrogen molar ratio to ethylene of 0.8% and a 1-hexene molar ratio to ethylene of 1.5%, and during the polymerization, ethylene, 1-hexene and hydrogen were continuously fed for maintaining the gas composition constant. The above-mentioned catalyst component and tri-isobutyl aluminum were fed continuously, so as to maintain a total powder weight in the fluidized bed of 80 kg constant. The average polymerization time was 4 hours.

To the powder of ethylene-1-hexene copolymer obtained, 1800 wt-ppm of Sumilizer GP (manufactured by Sumitomo Chemical Company, Ltd.) and 1000 wt-ppm of calcium stearate were added, the mixture obtained was granulated with an extruder (LCM 100 manufactured by Kobe Steel, Ltd.) under conditions of a feed rate of 350 kg/hour, screw rotation number of 450 rpm, gate opening of 4.2 mm, suction pressure of 0.2 MPa and resin temperature of 200 to 230° C., to obtain an ethylene-1-hexene copolymer. Evaluation results of the copolymer were shown in Table 1.

TABLE 1

| Property of Copolymer | Unit | Example 1 | Example 2 | Comparative Example 1 | Comparative Example 2 | Comparative Example 2 |
|---|---|---|---|---|---|---|
| MFR | g/10 min. | 0.54 | 0.55 | 0.78 | 2.23 | 1.01 |
| Density | Kg/m$^3$ | 912.1 | 921.6 | 922.4 | 919.6 | 920.9 |
| Ea | kJ/mol | 73 | 72 | 56 | 41 | 72 |
| CXS | Wt % | 8.3 | 3.1 | 1.1 | 2.1 | 3.7 |
| Left side of formula (1) | | 2.4 | 1.2 | 1.3 | 2.3 | 1.5 |
| Quantity of heat of fusion of cold xylene soluble part | J/g | 66 | 99 | — | — | — |
| t | sec | 6.0 | 8.0 | 10.0 | 5.9 | 6.2 |
| Right side of formula (2) | | 8.2 | 8.1 | 6.3 | 2.9 | 5.2 |
| Log A | — | 3.96 | 3.98 | 4.07 | 4.05 | 3.98 |
| Right side of formula (3) | | 3.98 | — | — | — | — |
| Right side of formula (4) | | — | 4.00 | 3.99 | 3.95 | 3.98 |
| [η] | dL/g | 1.13 | 1.14 | 1.20 | 1.12 | 1.03 |

| | | Example 1 | Example 2 | Example 3 | Comparative Example 1 | Comparative Example 2 |
|---|---|---|---|---|---|---|
| SR | — | 1.32 | 1.30 | 1.20 | 1.35 | 1.28 |
| Mw/Mn | — | 11.9 | 8.9 | 5.3 | 3.9 | 11.4 |
| MFRR | — | 101 | 124 | 85 | 50 | 91 |
| Maximum Melting point | ° C. | 102.0 | 105.5 | 121.0 | 120.0 | 106.0 |
| Fusion component of higher than 118° C. | | Existence | Existence | Existence | Existence | Existence |
| Property of molded article | | | | | | |
| FE | Number/m$^2$ | 19 | 22 | 98 | ≧1000 | 67 |
| Anti-blocking property | | ○ | ○ | ○ | ○ | ○ |
| Processability | | | | | | |
| Resin Pressure | MPa | 24 | 24 | 29 | 25 | 20 |
| MT | cN | 5.7 | 4.5 | 3.6 | 2.7 | 4.4 |

The invention claimed is:

1. An ethylene-α-olefin copolymer having monomer units derived from ethylene and monomer units derived from an α-olefin of 3 to 20 carbon atoms, a density (d) of 906 to 970 kg/m$^3$, wherein an activation energy (Ea) of flow is 50 kJ/mol or more, a quantity of heat of fusion of a cold xylene soluble part contained in the copolymer is 30 J/g or more, a molecular weight distribution defined as a ratio of weight average molecular weight to number average molecular weight of 5 or more, and a melt flow rate measured at 190° C. under a load of 21.18 N according to JIS K7210-1995 (MFR: unit is g/10 minutes), the density (d), a weight fraction of the cold xylene soluble part (CXS: unit; % by weight), a characteristic relaxation time (t, unit is second), a melt tension (MT: unit cN) and an intrinsic viscosity ([η], unit: dL/g) satisfy relations of the following formulas (1), (2), (5") and (6"):

$$10^{(30.3-0.0327 \times d+0.354 \times \log MFR)} < CXS < 20 \quad (1)$$

$$2 < t \leq 5.2 \times MFR^{-0.746} \quad (2)$$

$$2.5 \times MFR^{-0.059} < MT < 15 \times MFR^{-0.059} \quad (5'')$$

$$1.08 \times MFR^{-0.094} < [\eta] < 1.42 \times MFR^{-0.156} \quad (6'').$$

2. A copolymer having monomer units derived from ethylene and monomer units derived from an α-olefin of from 3 to 20 carbon atoms, and having a density (d) of 906 to 970 kg/m³, wherein an activation energy (Ea) of flow is 50 kJ/mol or more, a quantity of heat of fusion of a cold xylene soluble part contained in the copolymer is 30 J/g or more, a molecular weight distribution defined as a ratio of weight average molecular weight to number average molecular weight of 5 or more, and a melt flow rate measured at 190° C. under a load of 21.18 N according to JIS K7210-1995 (MFR; unit is g/10 minutes), a density (d; unit is kg/m³), a melt tension (MT; unit is cN), an intrinsic viscosity ([η]; unit is dL/g), a characteristic relaxation time (t; unit is second) and a rate of the cold xylene soluble fraction (CXS; unit is % by weight) satisfy relations of the following formulas (1), (2), (5") and (6"), and when the density is less than 915 kg/m³, a chain length (A) (unit is angstrom) of the highest molecular weight component and the MFR satisfy a relation of the following formula (3) or when the density is not less than 915 kg/m³, those satisfy a relation of the following formula (4):

$$10^{(30.3-0.0327 \times d+0.354 \times \log MFR)} < CXS < 20 \quad (1)$$

$$2t \leq 5.2 \times MFR^{-0.76} \quad (2)$$

$$3.3 < \log A \leq -0.0815 \times \log(MFR) + 3.96 \quad (3)$$

$$3.3 < \log A \leq -0.0815 \times \log(MFR) + 3.98 \quad (4)$$

$$2.5 \times MFR^{-0.059} < MT < 15 \times MFR^{-0.059} \quad (5'')$$

$$1.08 \times MFR^{-0.094} < [\eta] < 1.42 \times MFR^{-0.156} \quad (6'').$$

3. The copolymer according to claim 1, wherein the CXS, d, t and MFR satisfy the following formulas (1") and (2"):

$$10^{(30.5-0.0325 \times d+0.354 \times \log MFR)} < CXS < 20 \quad (1'')$$

$$2 < t \leq 5.0 \times MFR^{-0.746} \quad (2'').$$

4. The copolymer according to claim 2, wherein the CXS, d, MFR and A satisfy the following formulas:

$$10^{(30.5-0.0325 \times d+0.354 \times \log MFR)} < CXS < 20 \quad (1''), \text{ and}$$

when the density is less than 915 kg/m³, $$3.3 < \log A \leq -0.0815 \times \log(MFR) + 3.94 \quad (3''), \text{ or}$$

when the density is not less than 915 kg/m³, $$3.3 < \log A \leq -0.0815 \times \log(MFR) + 3.96 \quad (4'').$$

* * * * *